United States Patent
Freitag et al.

(10) Patent No.: US 6,308,069 B1
(45) Date of Patent: Oct. 23, 2001

(54) METHOD AND COMMUNICATION SYSTEM FOR THE FIRST-TIME ENTRY OF SUBSCRIBER DATA OF A MOBILE SUBSCRIBER INTO A CENTRAL SUBSCRIBER DATA BASE

(75) Inventors: Bernhard Freitag, Bad Hersfeld; Manfred Reich, Grossinzemoos, both of (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/254,736

(22) PCT Filed: Aug. 11, 1997

(86) PCT No.: PCT/DE97/01708

§ 371 Date: Mar. 11, 1999

§ 102(e) Date: Mar. 11, 1999

(87) PCT Pub. No.: WO98/11749

PCT Pub. Date: Mar. 19, 1998

(30) Foreign Application Priority Data

Sep. 12, 1996 (DE) .............................................. 196 37 153

(51) Int. Cl.$^7$ ...................................................... H04Q 7/20
(52) U.S. Cl. ........................... 455/435; 455/419; 455/433
(58) Field of Search .................................. 455/419, 418, 455/432, 433, 403, 445

(56) References Cited

U.S. PATENT DOCUMENTS

| | | | |
|---|---|---|---|
| 5,077,790 | 12/1991 | D'Amico et al. | 455/435 |
| 5,297,191 | * 3/1994 | Gerszberg | 455/419 |
| 5,485,505 | * 1/1996 | Norman et al. | 455/419 |
| 5,603,084 | * 2/1997 | Henry, Jr. et al. | 455/419 |
| 6,014,561 | * 1/2000 | Molne | 455/419 |

FOREIGN PATENT DOCUMENTS

| | | |
|---|---|---|
| 41 38 935 C2 | 6/1993 | (DE) . |
| 0 164 312 | 12/1985 | (EP) . |
| 0 481 714 A2 | 4/1992 | (EP) . |
| WO 94/08433 | 4/1994 | (WO) . |
| WO 96/21327 | 7/1996 | (WO) . |
| WO 96/27270 | 9/1996 | (WO) . |

\* cited by examiner

*Primary Examiner*—Edward F. Urban
(74) *Attorney, Agent, or Firm*—Bell, Boyd & Lloyd LLC

(57) ABSTRACT

A method and communication system for the first-time entry of subscriber data of a mobile subscriber into a central subscriber data base wherein entry composed of a special telephone number and of blocking information for temporarily barring calls for the mobile subscriber is formed in at least one central subscriber data base and is transferred into a decentralized subscriber data base that is the first one responsible for the location registration for the mobile radio telephone subscriber on the basis of his current location. As soon as the mobile subscriber makes an outgoing call for the first time via a radio telephone subscriber station, a connection setup occurs to a calling point on the basis of the special telephone number stored in the decentralized subscriber data base. The subscriber data, including a mobile subscriber telephone number is entered into the central subscriber data base via the calling point, and the blocking information reset therein and the special telephone number is deleted.

5 Claims, 1 Drawing Sheet

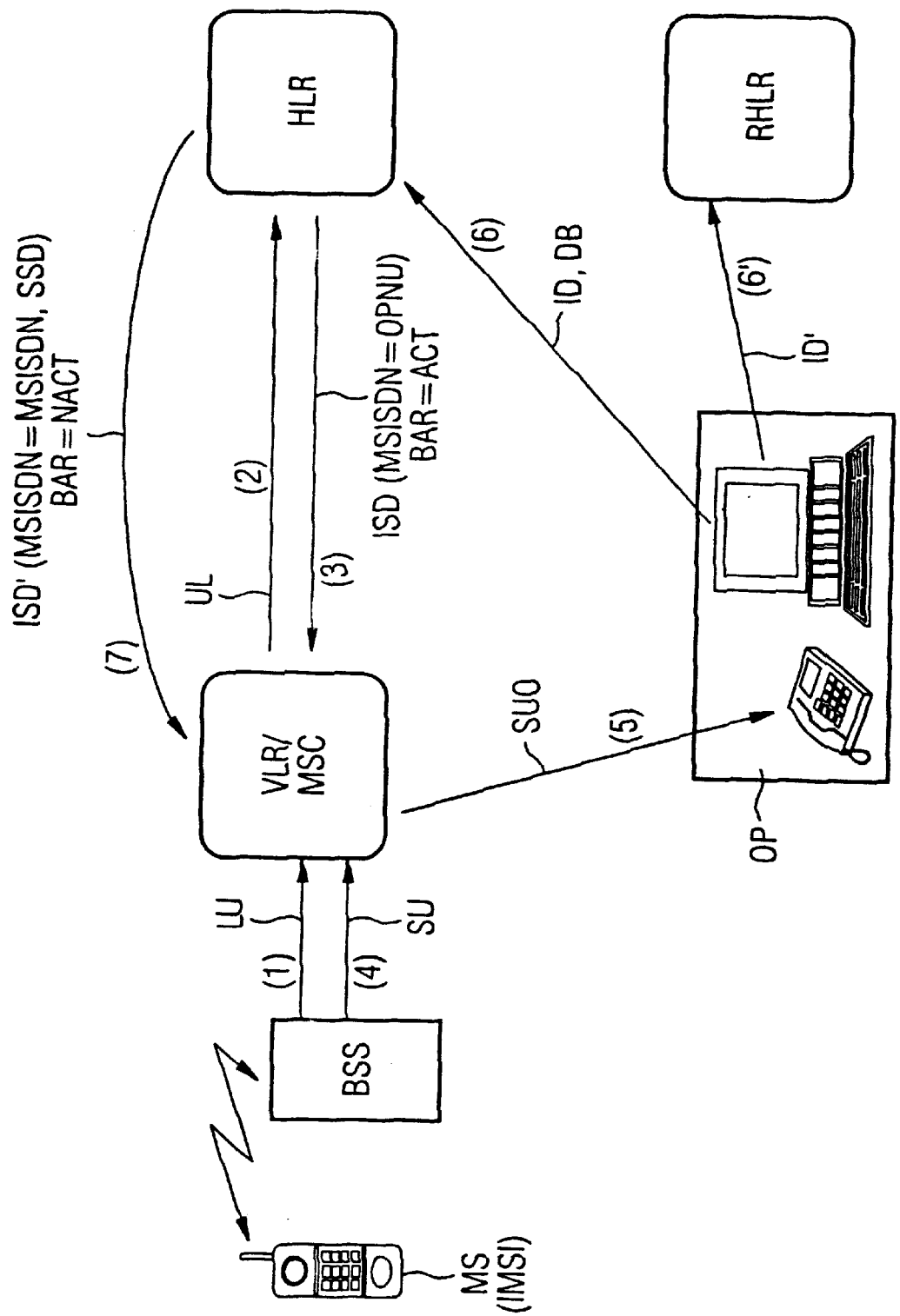

METHOD AND COMMUNICATION SYSTEM FOR THE FIRST-TIME ENTRY OF SUBSCRIBER DATA OF A MOBILE SUBSCRIBER INTO A CENTRAL SUBSCRIBER DATA BASE

The present invention is directed to a method, and to a communication system, for the first-time entry of subscriber data of a mobile subscriber that can be identified by a mobile subscriber identifier in a mobile radio telephone network and that would like to accept and make calls with a radio telephone subscriber station into a central subscriber data base.

As is known, in this field a mobile subscriber telephone number is assigned to every mobile subscriber of a mobile radio telephone network; for example, a communication system operated according to the GSM standard. Further, telecommunication services are allocated to this mobile subscriber telephone number wherein it is entered in advance in at least one central subscriber data base (home register) for the mobile subscriber. Upon acquisition of the radio telephone subscriber station with which the mobile subscriber can accept and make calls or, respectively, of a chip card (SIM card, subscriber identity module) introduceable into a radio telephone subscriber station on the basis whereof an allocation of the radio telephone subscriber station to the mobile subscriber occurs, prepared service packages having a predetermined scope are usually offered by the seller. The seller must thereby inform the service provider or the network operator of the scope of the services before the previously initialized chip card, on which the mobile subscriber identifier of the mobile subscriber is stored, can be enabled. The radio telephone subscriber station can receive and send calls only after this. Individual services or specific subscriber data such as, for example, a vanity telephone number are either not possible at all or are only possible by accepting a time-consuming, mutual information process between dealer, service provider or, network operator.

International Patent Application WO-A-96/27270 discloses a method and an arrangement for programming a mobile terminal equipment with identification numbers respectively allocated by a cellular mobile radiotelephone system via a topically remote location. Data of a mobile subscriber are thereby entered for the first time in at least one central subscriber database of the mobile radiotelephone system.

An object of the present invention is to specify a method and communication system for the entry of subscriber data into a central subscriber data base with which the first-time entry of the subscriber data occurs as simply and flexibly as possible.

SUMMARY OF THE INVENTION

In accord therewith, an entry composed of a special telephone number and of blocking information for temporarily blocking the calls for the mobile subscriber is formed in the central subscriber data base and is transferred into the decentralized subscriber data base that is the first that is responsible for the location registration for the mobile radio telephone subscriber due to his current location. As soon as the mobile subscriber has made an outgoing call via the radio telephone subscriber station for the first time, a call setup occurs to a calling location on the basis of the special telephone number stored in the decentralized subscriber data base. The subscriber data, including a mobile subscriber telephone number, are entered into the central subscriber data base via the calling location, wherein the blocking information therein is reset and the special telephone number is deleted.

As such, the mobile subscriber can have his individual subscriber data entered in the home register in a flexible way as soon as possible after the purchase of a radio telephone subscriber station, or SIM chip card, as soon as he has signaled the first connection request by outputting a call to the network. As a result of the special telephone number entered for him in the central subscriber data base, a rerouting of the connection that is usually set up on the basis of the outgoing call to the calling location is effected. The blocking information serves the purpose of suppressing calls before the subscriber data for the mobile subscriber are registered in the central subscriber data base and, thus, the acceptance or, respectively, making of calls is possible in the mobile radio telephone network. The dealer who sells the radio telephone subscriber station, or SIM chip card, is no longer involved in the initialization procedure for enabling the card or, respectively, the radio telephone subscriber station. This avoids the aforementioned disadvantages of a lack of assigning individual subscriber data, particularly of the different services desired in terms of nature and scope, as well as a time-consuming registration procedure.

According to an embodiment of the present invention, a specific subscriber telephone number (vanity telephone number) that deviates from the mobile subscriber telephone numbers administered by the central subscriber data base, and that is administered by a different central subscriber data base, is entered for the mobile subscriber as subscriber datum. It is thereby advantageous when reference information for the identification of the central subscriber data base containing the subscriber data is stored in the other central subscriber data base.

Additional features and advantages of the present invention are described in, and will be apparent from, the Detailed Description of the Preferred Embodiments and the Drawings.

DESCRIPTION OF THE DRAWINGS

FIG. 1 shows a block circuit diagram of the executive sequence for the first-time entry of the subscriber data of a mobile subscriber in the home register of the mobile radio telephone network of the present invention.

DETAILED DESCRIPTION OF THE PREFERRED EMBODIMENTS

The present invention is explained on the basis of the exemplary embodiment shown in FIG. 1. A mobile subscriber who purchases a radio telephone subscriber station MS or, respectively, an SIM chip card that is introduced into a radio telephone subscriber station is assigned to the radio telephone subscriber station MS by a mobile subscriber identifier IMSI stored on the chip card. The mobile subscriber identifier serves for the unambiguous identification of the mobile subscriber within a mobile radio telephone network; for example, the international GSM mobile communication system (Global System For Mobile Communication). The allocation of the mobile subscriber identifier IMSI, which is unknown to the mobile subscriber, to a mobile subscriber telephone number MSISDN is made in the mobile radio telephone network, by the decentralized subscriber data base,—the home register,—designated HLR in the present example. Before the mobile subscriber can accept and make calls with the radio telephone subscriber station MS, his subscriber data must be deposited for the first time in at least the central subscriber data base of the mobile radio telephone network in an initialization procedure, usually as a home register that is responsible for him. The subscriber data includes a plurality of information such as, for example, basic telecommunication services, supplementary services, data services, access authorization to specific service locations, routing information for call handling, and a plurality of identifiers for addressing and identifying such as, for example, the international mobile subscriber identifier IMSI and the international mobile subscriber telephone number MSISDN, etc.

The cellularly constructed mobile radio telephone network includes a radio-oriented part with a base station system BSS and a switching-oriented part with mobile switching centers MSC, decentralized subscriber data bases, or—visitor registers,—VLR and central subscriber data bases, or—home registers,—HLR, RHLR. Each radio cell of the cellular mobile radio telephone network is covered by a base transmission/reception station, of which one or more base transmission/reception stations are respectively connected to a base station controller in the base station system BSS. The mobile switching center MSC to which a visitor register VLR is allocated services, on the one hand, one or more base station controllers of the base station system BSS and sets up, on the other hand, connections to other networks such as, for example, a public telephone network. When a mobile subscriber is located in the coverage area of a visitor register, his subscriber data is temporarily stored in the visitor register VLR for the duration of his residency. The visitor register VLR thereby contains all subscriber data that is needed for the call handling, the call setup and the location registration. Additionally, a calling point OP is provided to which a connection for the first-time registration of the subscriber data in the home register is set up. The calling point OP can be reached via a specific telephone number,— as is explained in greater detail later a—and can initiate the entry of the individual subscriber data for the mobile subscriber via an operator in the form of a machine or a human operator.

When the radio telephone subscriber station MS is switched on for the first time or, respectively, given a request for updating the location registration, a message LU (location update) is initiated by the radio telephone subscriber station MS, wherein the message LU is sent to the mobile switching center MSC (1) via the base transmission/reception station responsible for the radio cell in which the mobile subscriber is located. The mobile switching center MSC subsequently sends an updating message UL (update location) to the home register HLR that is defined (2) by the mobile subscriber identifier IMSI. The selection of the correct home register HLR occurs on the basis of the mobile subscriber identifier IMSI communicated to the visitor register VLR in the message LU or with the assistance of information sent in the message LU from which the mobile subscriber identifier IMSI is identified. These information can, for example, be composed of a radio cell identifier and/or of a temporary mobile subscriber identifier. For later procedures in the call setup, the home register HLR can also be selected on the basis of a HLR address respectively entered in the visitor register VLR.

An entry composed of a special telephone number OPNU and of a blocking information BAR that is set for temporary blocking the calls through the mobile subscriber (BAR= ACT) is formed in the home register HLR. Such an entry in the home register HLR is produced for every SIM chip card sold, for example, by a dealer in order to allow the subscriber data for the mobile subscriber identifiable with the mobile subscriber identifier IMSI to be entered as soon as the mobile subscriber initially attempts to make a call. As a reply to the message UL, the home register HLR sends a message ISD (insert subscriber data) back to the visitor register VLR in which the special telephone number OPNU; is contained (3) for example; as mobile subscriber telephone number MSISDN that quasi represents a virtual mobile subscriber telephone number and not the real mobile subscriber telephone number required for the call setup in the network. Alternatively thereto, the special telephone number OPNU also can be contained in a field that is usually reserved for a number when blocking calls (call barring) or when forwarding calls (call forwarding), or it can be contained in a specific expansion of the message ISD. The transmission of the message ISD between home register HLR and visitor register VLR occurs according to the mobile radio telephone-specific application part (mobile application part) of the CCS7 signaling system that is provided for the communication of the elements of the mobile radio telephone network for controlling the network access of the radio telephone subscriber stations MS and that need not be modified for the present invention.

When the mobile subscriber makes an outgoing call (mobile originating call) via the radio telephone subscriber station MS for the first time, which can be recognized by the mobile switching center MSC on the basis of an arriving message SU (setup call) (4), the visitor register VLR responsible for the mobile subscriber as first decentralized subscriber data, based on the subscriber's current location, determines whether the blocking information BAR is active for the mobile subscriber. When the blocking information is present, the destination subscriber telephone number on which the initiated call is based is replaced by the special telephone number OPNU in order to setup a connection from the mobile switching center MSC to the calling point OP. To this end, a message SUO for connection setup is transmitted (5) between the mobile switching center MSC and the calling point OP. The calling point can be established by a network operator or a service provider who, for example, makes services available to the mobile subscriber on behalf of the network operator. Via the calling point OP, the subscriber data that is individually customized for the respective mobile subscriber in terms of scope and type are written into the home register HLR via the message ID.

Thus, for example, a specific service package or the entire scope of services including fundamental telephone communication services and additional, individual services and/or a specific subscriber telephone number (vanity telephone number) can be entered into the home register HLR responsible for the mobile subscriber. Over and above this, the blocking information BAR activated in the home register HLR is reset after the first-time entry of valid subscriber data for the mobile subscriber and the special telephone number OPNU is deleted (6). When the mobile subscriber would like to have the specific subscriber telephone number (MSISDN) as subscriber datum, which deviates from a mobile subscriber telephone number that can usually be allocated to the mobile subscriber identifier IMSI, a message ID' is sent from the calling point OP to a different home register RHLR (relay home register). The allocation of the mobile subscriber telephone number occurs by assigning a number from the supply of numbers available to the home register HLR. Reference information for the identification of the home register HLR in which the subscriber data is stored is stored (6') in the home register RHLR. Given call handling on the basis of a call upon employment of the specific subscriber telephone number (MSISDN), thus, it is assured that a connection from the home register RHLR responsible for the mobile subscriber is set up to the home register HLR defined by the mobile subscriber identifier IMSI that is unknown to the mobile subscriber. The administration of the specific subscriber telephone numbers is the responsibility of the home register RHLR by storing the reference information, whereas the real mobile subscriber telephone number for the mobile subscriber also is entered in the home register HLR actually responsible for him.

In a message ISD' (insert subscriber data), the real mobile subscriber telephone number MSISDN and the subscriber data SSD entered for the mobile subscriber, as well as the deactivated blocking information (BAR=NACT) are transmitted (7) from the home register HLR to the visitor register VLR in order to replace the entry composed of the special telephone number OPNU and the activated blocking information (BAR=ACT) by the communicated information. Following the activation of the subscriber data including the services, the mobile subscriber has the possibility of making outgoing calls via the radio telephone subscriber station (MS) and accepting incoming calls that are handled and sequenced in the mobile radio telephone network in a known fashion according to the subscriber data of the mobile subscriber stored in at least one home register.

Although the present invention has been described with reference to specific embodiments, those of skill in the art will recognize that changes may be made thereto without departing from the spirit and scope of the invention as set forth in the hereafter appended claims.

What is claimed is:

1. A method for the first-time entry of subscriber data of a mobile subscriber that is identifiable in a mobile radio telephone network by a mobile subscriber and identifier and that would like to accept and make calls with a radio telephone subscriber station in at least one central subscriber data base, the method comprising the steps of:

forming in the central subscriber data base an entry having both a special telephone number and blocking information that is set for temporarily barring calls for the mobile subscriber;

transferring the entry from the central subscriber data base into a decentralized subscriber data base that is a first one responsible for location registration for the mobile radio telephone subscriber based on a current location of the subscriber;

setting up a connection to a calling point based on the special telephone number stored in the decentralized subscriber data base as soon as an outgoing call from the mobile subscriber is made for the first time via the radio telephone subscriber station;

entering the subscriber data, including a mobile subscriber telephone number, via the calling point into the central subscriber data base wherein a specific subscriber telephone number is entered as the subscriber data for the mobile subscriber, the specific subscriber telephone number not belonging to mobile subscriber telephone numbers administered by the central subscriber data base and being administered by a second central subscriber data base;

resetting the blocking information in the central subscriber data base; and deleting the special telephone number.

2. A method as claimed in claim 1, further comprising the step of:

storing reference information for the identification of the central subscriber data base containing the subscriber data in the second central subscriber data base.

3. A method as claimed in claim 1, wherein the connection to a calling point of one of a network operator and a service provider is set up by these special telephone number.

4. A methos as claimed in claim 1, wherein the scope and nature of the subscriber data are individually entered into the central subscriber data base for the mobile subscriber.

5. A communication system for the first-time entry of subscriber data of a mobile subscriber that is identifiable in a mobile radio telephone network by a mobile subscriber identifier and that would like to accept and make calls with a radio telephone subscriber station in a central subscriber data base, the communication system comprising:

at least one central subscriber data base for storing an entry which includes both a special telephone number and blocking information that can be set for temporarily barring calls for the mobile subscriber;

a decentralized subscriber data base that is a first one responsible for location registration for the mobile radio telephone subscriber based on a current location of the subscriber for accepting the entry from the central subscriber data base; and a calling point which is arranged such that a connection is set up to the calling point based on the special telephone number stored in the decentralized subscriber data base as soon as the mobile subscriber makes an outgoing call for the first time via the radio telephone subscriber station, and such that the subscriber data, including a mobile subscriber telephone number, is entered into the subscriber data base via the calling point and the blocking information is reset in the central subscriber data base and the special telephone number is deleted, and wherein the calling point is arranged such that reference information for identification of the central subscriber data base containing the subscriber data is stored via the calling point in a second central subscriber data base.

* * * * *